United States Patent
Malik et al.

(10) Patent No.: US 10,534,780 B2
(45) Date of Patent: Jan. 14, 2020

(54) SINGLE UNIFIED RANKER

(71) Applicant: Microsoft Technology Licensing, LLC, Redmond, WA (US)

(72) Inventors: Manish Malik, Cupertino, CA (US); Qifa Ke, Cupertino, CA (US); Rangan Majumder, Redmond, WA (US); Andreas Bode, Munich (DE); Pushpraj Shukla, Dublin, CA (US); Yu Shi, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 14/925,360

(22) Filed: Oct. 28, 2015

(65) Prior Publication Data
US 2017/0124078 A1    May 4, 2017

(51) Int. Cl.
*G06F 16/2457*    (2019.01)
*G06F 16/248*    (2019.01)

(52) U.S. Cl.
CPC ...... *G06F 16/24578* (2019.01); *G06F 16/248* (2019.01); *G06F 16/24575* (2019.01)

(58) Field of Classification Search
CPC .............. G06F 17/30528; G06F 17/3053
See application file for complete search history.

(56) References Cited

U.S. PATENT DOCUMENTS

| | | |
|---|---|---|
| 6,012,053 A | 1/2000 | Pant et al. |
| 7,296,016 B1 | 11/2007 | Farach-Colton et al. |
| 7,822,742 B2 | 10/2010 | Majumder et al. |
| 7,917,488 B2 | 3/2011 | Niu et al. |
| 8,078,197 B2 | 12/2011 | Gutierrez et al. |

(Continued)

FOREIGN PATENT DOCUMENTS

| | | |
|---|---|---|
| CN | 104462611 A | 3/2015 |
| EP | 2950226 | 12/2015 |

(Continued)

OTHER PUBLICATIONS

Levandoski, et al., "CareDB: A Context and Preference-Aware Location-Based Database System", In Proceedings of 36th International Conference on Very Large Data Bases, Sep. 13, 2010, pp. 1529-1532.

(Continued)

*Primary Examiner* — Kris E Mackes

(57) ABSTRACT

Non-limiting examples of the present disclosure describe a unified ranking model that may be used by a plurality of entry points to return ranked results in response to received query data. The unified ranking model is provided as a service for a plurality of entry points. A query is received from an entry point of the plurality of entry points. Results data for the query data is retrieved. A unified ranking model is executed to rank the results data. Execution of the unified ranking model manipulates feature data of the unified ranking model based on user context signals associated with the received query data and acquired result retrieval signals corresponding with the retrieved results data. Execution of the unified ranking model generates ranked result data. Ranked results data is returned to the processing device corresponding with the entry point. Other examples are also described.

20 Claims, 9 Drawing Sheets

(56) References Cited

U.S. PATENT DOCUMENTS

| | | |
|---|---|---|
| 8,239,380 B2 | 8/2012 | Brill |
| 8,396,857 B2 | 3/2013 | Kamel et al. |
| 8,688,696 B2 | 4/2014 | Rault et al. |
| 9,026,530 B2 | 5/2015 | Gouyet et al. |
| 9,037,581 B1 | 5/2015 | Zamir et al. |
| 2004/0093325 A1 | 5/2004 | Banerjee et al. |
| 2006/0123014 A1 | 6/2006 | Ng |
| 2007/0168335 A1* | 7/2007 | Moore .............. G06F 17/30864 |
| 2007/0266025 A1 | 11/2007 | Wagner et al. |
| 2009/0222437 A1 | 9/2009 | Niu et al. |
| 2010/0250523 A1 | 9/2010 | Jin et al. |
| 2010/0325105 A1 | 12/2010 | Guo et al. |
| 2012/0317104 A1 | 12/2012 | Radlinski et al. |
| 2012/0323898 A1 | 12/2012 | Kumar et al. |
| 2013/0198174 A1 | 8/2013 | Poznanski et al. |
| 2013/0282713 A1 | 10/2013 | Lawrence |
| 2016/0004725 A1* | 1/2016 | Liu ................... G06F 17/30241 707/724 |

FOREIGN PATENT DOCUMENTS

| | | | |
|---|---|---|---|
| WO | 2007080413 A1 | 7/2007 | |
| WO | 2010029215 A1 | 3/2010 | |
| WO | 2014039738 A1 | 3/2014 | |

OTHER PUBLICATIONS

Schwartz, Barry, "Mobilegeddon Cometh: New Google "Mobile Friendly Update" To Reward Sites", Published on: Feb. 26, 2015, Available at: http://searchengineland.com/google-search-algorithm-adds-mobile-friendly-factors-app-indexing-ranking-215573, 13 pgs.

PCT International Preliminary Report on Patentability in PCT/US2016/058101, dated Jul. 24, 2017, 9 pages.

Anonymous, "Machine Learning—How and Why do Normalization and Feature Scaling Work?—Cross Validated", Retrieved from: <<http://stats.stackexchange.com/questions/41704/how-and-why-do-normalization-and-feature-scaling-work>>, Nov. 1, 2012, 2 Pages.

"International Search Report and Written Opinion Issued in PCT Application No. PCT/US2016/058101", dated Jan. 18, 2017, 14 Pages.

* cited by examiner

500

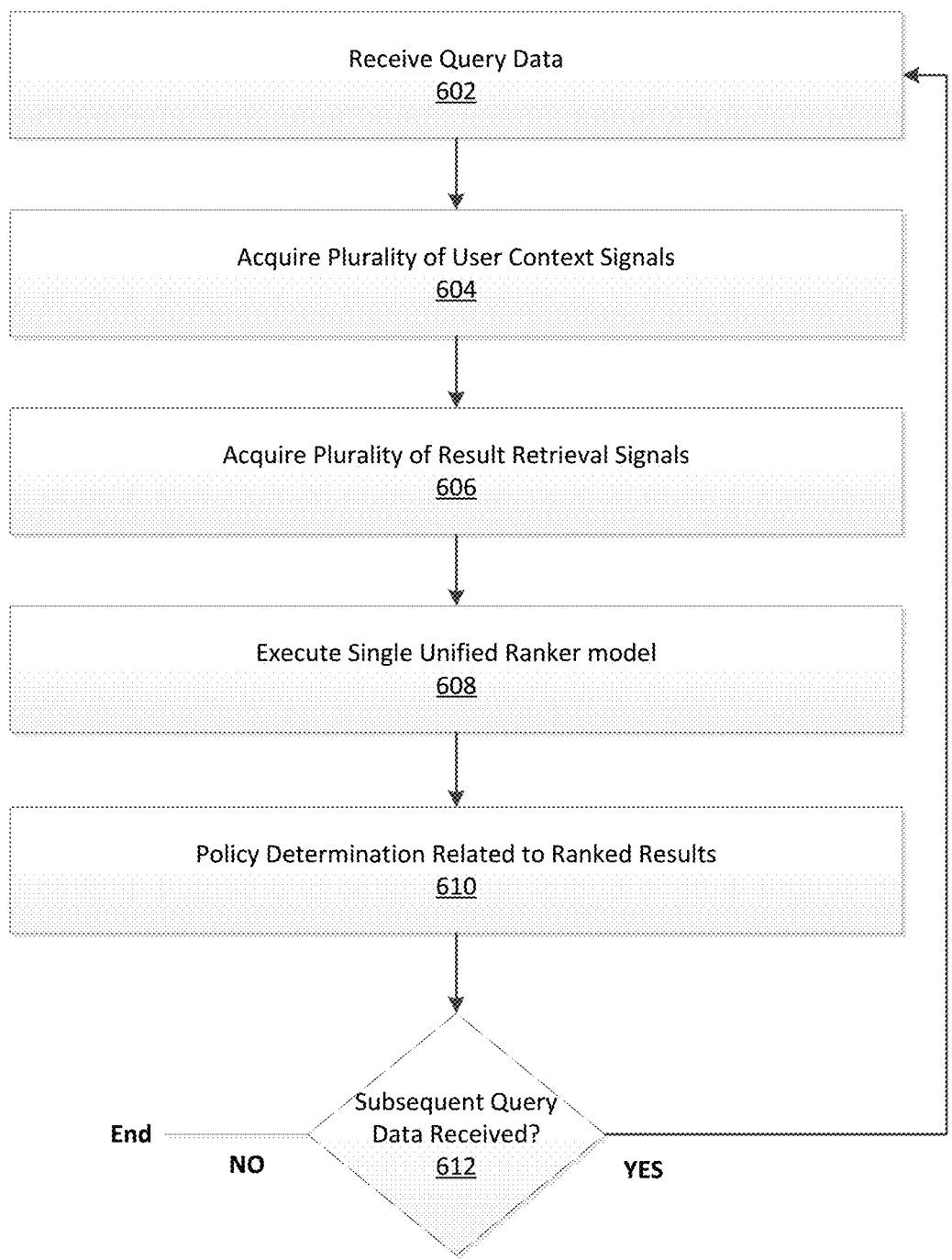

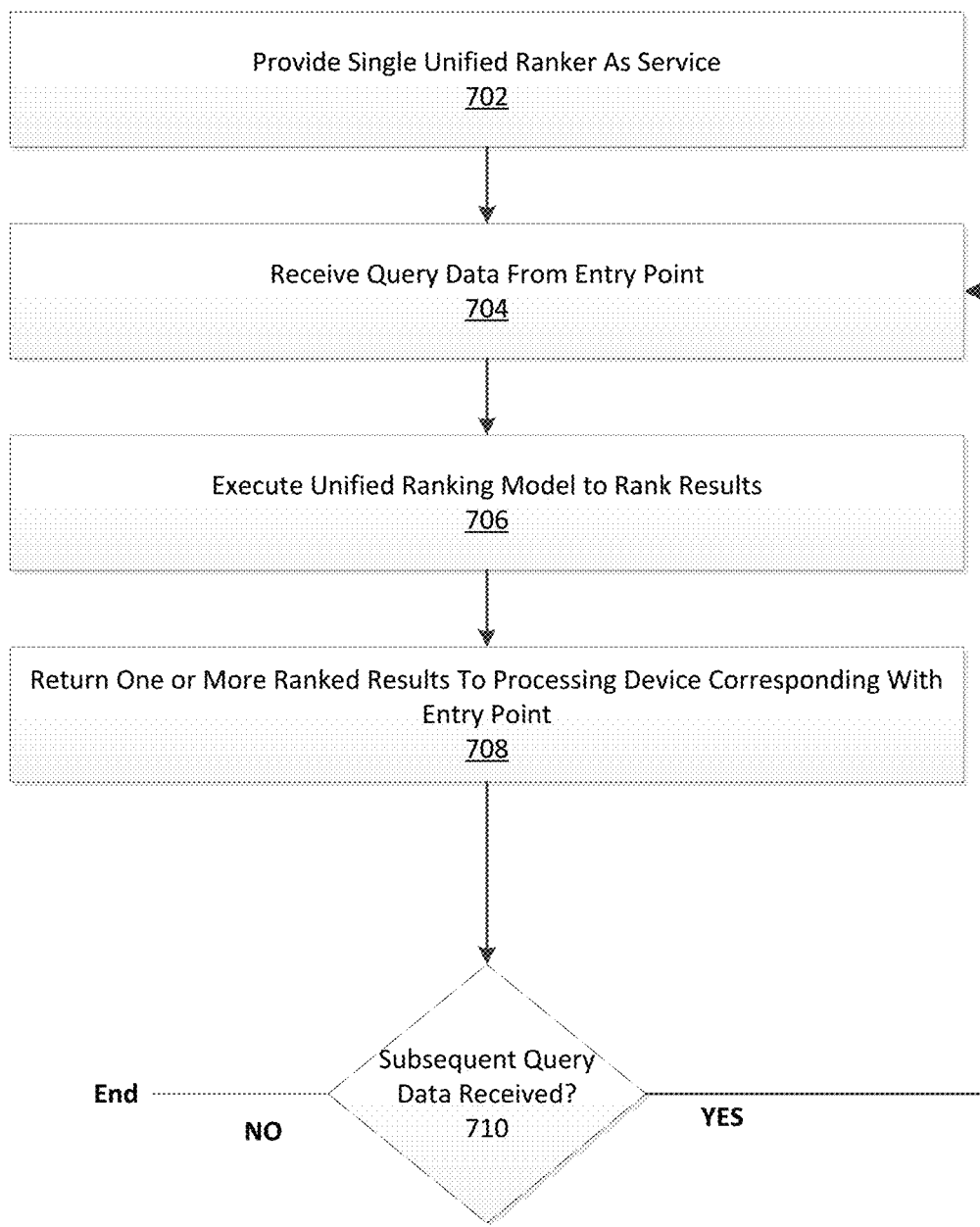

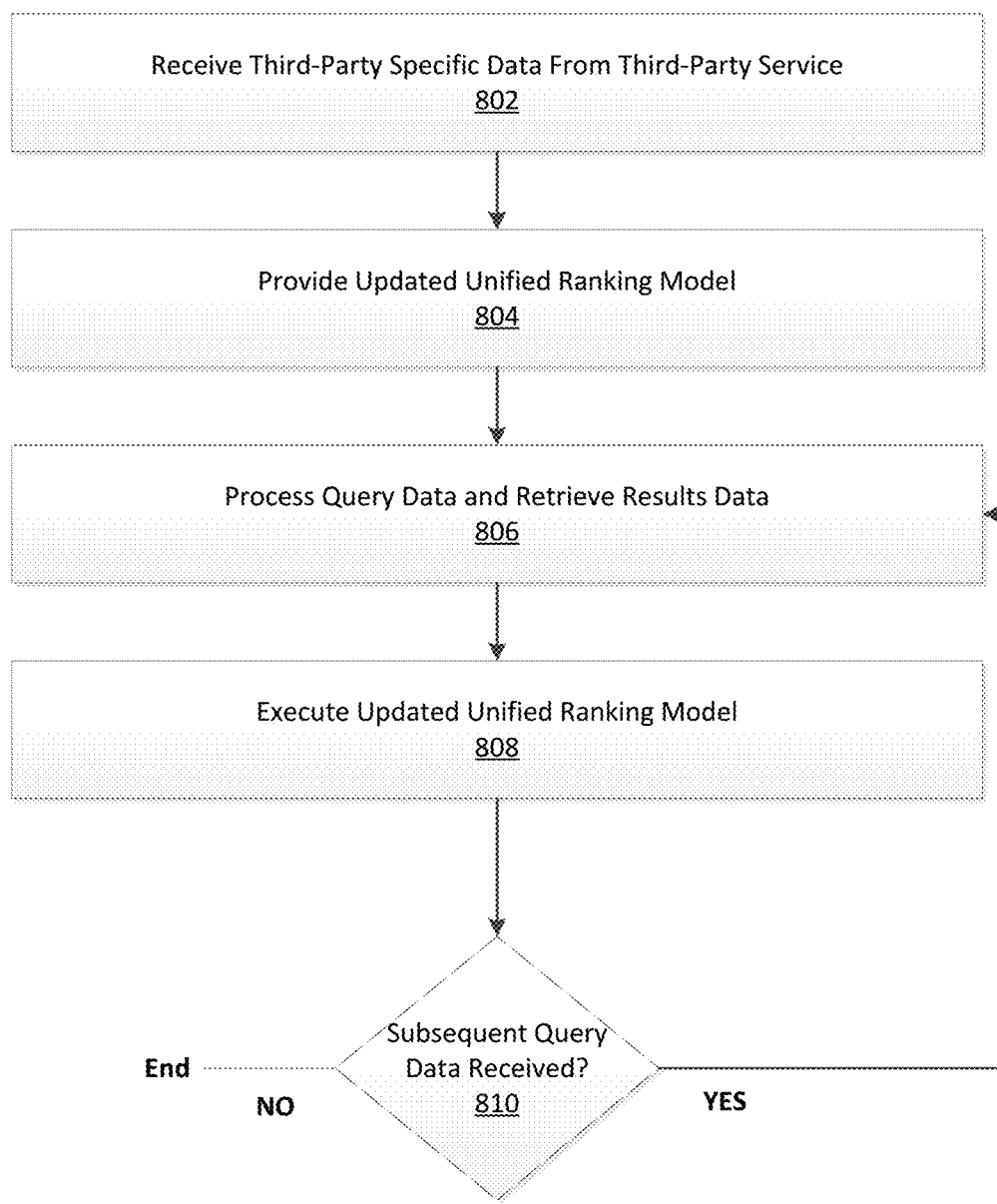

SINGLE UNIFIED RANKER

BACKGROUND

Web rankers are used to process query data, acquire search results, rank the search results, and return the ranked search results. Traditionally, web rankers are narrowly configured to rank results based on a specific attribute such as a location of a user when a query is initiated. In such a scenario, for web rankers to evaluate search results in a plurality of different contexts, multiple web rankers would need to be applied that each rank different attributes. Issues arise because it is inefficient to maintain a plurality of individual web rankers for thorough analysis of results data. Further, it becomes difficult to decide how to blend analysis received from a plurality of individual web rankers in order to generate a final ranking score for results data. Moreover, traditional web rankers are limited in that results data is ranked and returned irrespective of a device used to make the query (e.g., desktop, tablet, mobile device, etc.). It is with respect to the general technical environment of improving web ranking that the present application is directed.

SUMMARY

Non-limiting examples of the present disclosure describe a unified ranking model that may be used to improve ranking of results data returned in response to a received query. A unified ranker may execute a unified ranking model to rank results data in response to received query data. The unified ranker takes into account a plurality of signals including signals for: location, form-factor, time, entry points and personalization, as context to rank results data or update ranking results data. In examples, query data may be received. A plurality of user context signals associated with the query data may be acquired by a processing device. Results data for the query data may be retrieved. Further, a plurality of result retrieval signals may be acquired for the retrieved results data. A unified ranking model may be applied to rank the results data. Execution of the unified ranking model may comprise executing feature normalization on data of the unified ranking model based on the acquired user context signals and the acquired result retrieval signals, to generate normalized feature data. The unified ranking model further applies the normalized feature data to rank the results data. One or more of the ranked results data may be output for further processing. As an example, results data may be displayed on the processing device or transmitted to another processing device.

Other non-limiting examples of the present disclosure further describe a unified ranking model that may be used by a plurality of entry points and may return ranked results in response to received query data. The unified ranking model is provided as a service for a plurality of entry points. A query is received from an entry point of the plurality of entry points. The query is received from a processing device corresponding with the entry point. Results data for the query data is retrieved. A unified ranking model is executed to rank the results data. Execution of the unified ranking model manipulates feature data of the unified ranking model based on user context signals associated with the received query data and acquired result retrieval signals corresponding with the retrieved results data. Execution of the unified ranking model generates ranked result data. Ranked results data are returned to the processing device corresponding with the entry point.

Moreover, non-limiting examples of the present disclosure describe providing a unified ranking model as a service for access by third-party services. In examples, third-party specific data may be received from a third-party service for update of the unified ranking model. The updated unified ranking model may be provided as a service. Query data may be received from the third-party service. Results data may be retrieved in response to the query data. The updated unified ranking model may be applied to rank the results data. Execution of the unified ranking model utilizes the third-party specific data to generate feature data for evaluation of signal data associated with the received query data. One or more ranked results may be returned to a processing device corresponding with the third-party service based on application of the updated unified ranking model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 is an exemplary method for processing using a unified ranking model with which aspects of the present disclosure may be practiced.

FIG. 7 is an exemplary method for providing a unified ranker as a service with which aspects of the present disclosure may be practiced.

FIG. 8 is an exemplary method for interacting with third-party services with which aspects of the present disclosure may be practiced.

DETAILED DESCRIPTION

Figure 1:
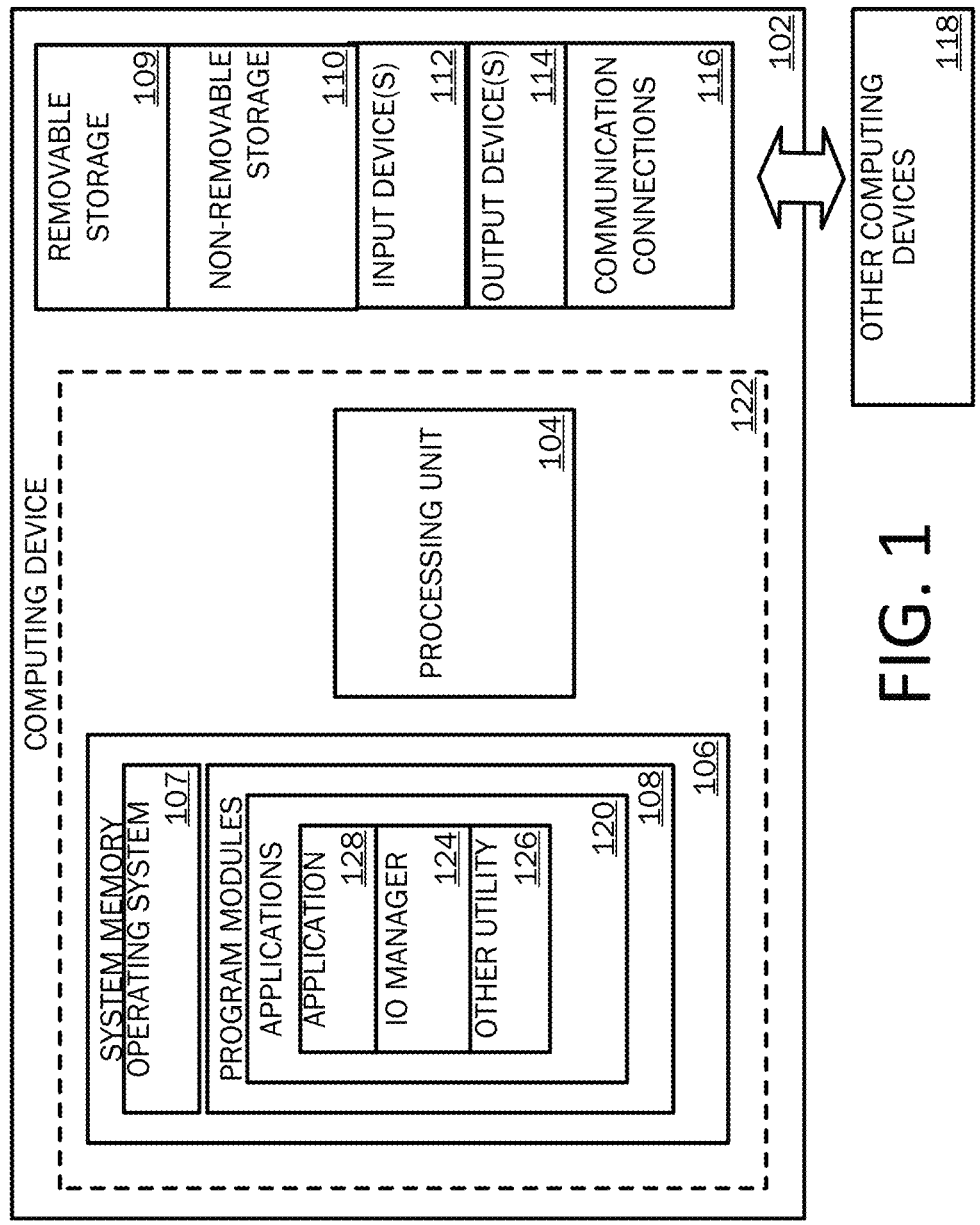
FIG. 1 is a block diagram illustrating an example of a computing device with which aspects of the present disclosure may be practiced.

The present disclosure describes generation and application of a unified ranking model that is applicable to be integrated within different markets and/or products to provide ranked results data in response to a received query. The unified ranking model may be employed as part of a unified ranker that may be integrated within and/or offered as a service for a plurality of entry points. An entry point is a point of entry or platform for communication with an application or service for performance of unified ranking processing. In examples, an entry point may include but is not limited to: any applications/services including search applications, intelligent personal assistant applications, first-party products/services, second-party products/services, and third-party products/services, among other examples. The unified ranking model may be used to rank/re-rank results data for search results found in response to receiving query data. Examples described herein referencing a unified ranker that executes a unified ranking model are not limited to search results obtained over the Internet. Examples also apply to search results obtained in any network or collection of networks. Examples described herein solve scalability issues related to processing of data using a plurality of individual web rankers by combining a variety of features into a unified ranking model that comprehensively evaluates signal data retrieved for context associated with query data as well as context associated with retrieved results data. With the need for ranking as a service and increased use or tablet and mobile devices, an exemplary unified ranking model may be built and managed, where the unified ranking model is configured to rank retrieved query results by taking into account signals related to user location, form-factor, time, entry points and personalization as context, among other examples. In examples, the unified ranking model may be built and trained to account for received signals on a query side (e.g., received query and user context signals associated with the received query) and retrieved signals on a document side (e.g., result retrieval) to optimize ranking for a variety of different situations, users, etc. In this way, examples of the present disclosure provide a scalable and extensible model for ranking that can be applied in different markets and products while personalizing an experience for a user.

Accordingly, the present disclosure provides a plurality of advantages including but not limited to: a scalable and extensible unified ranking model including a unified ranker that accounts for form factor of processing device, streamlining of ranking using a unified ranking model, ranking optimization that takes into account a plurality of user context signals and a plurality of result retrieval signals to improve returning of results, ability to provide a unified ranker as a service to integrate with a plurality of applications and products including third-party services, reduction of processing load for ranking services, and reduction in maintenance overhead for ranking processing as compared with use of multiple rankers and more efficient processing of search result data ranking (e.g., saving computing cycles/computing resources by providing more accurate search results that require fewer follow-up searches).

Figure 2A:
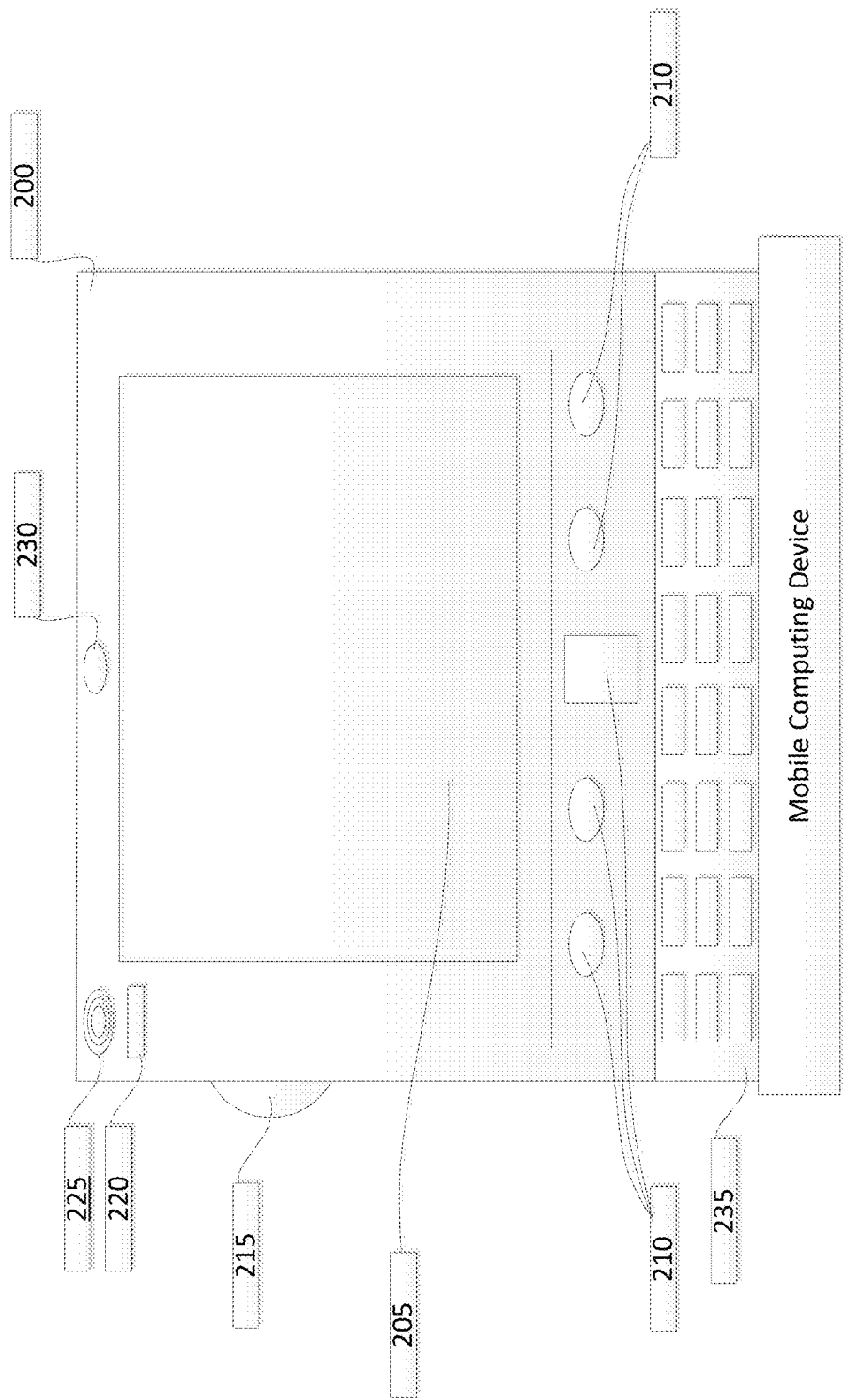
FIGS. 2A and 2B are simplified block diagrams of a mobile computing device with which aspects of the present disclosure may be practiced.
Figure 2B:
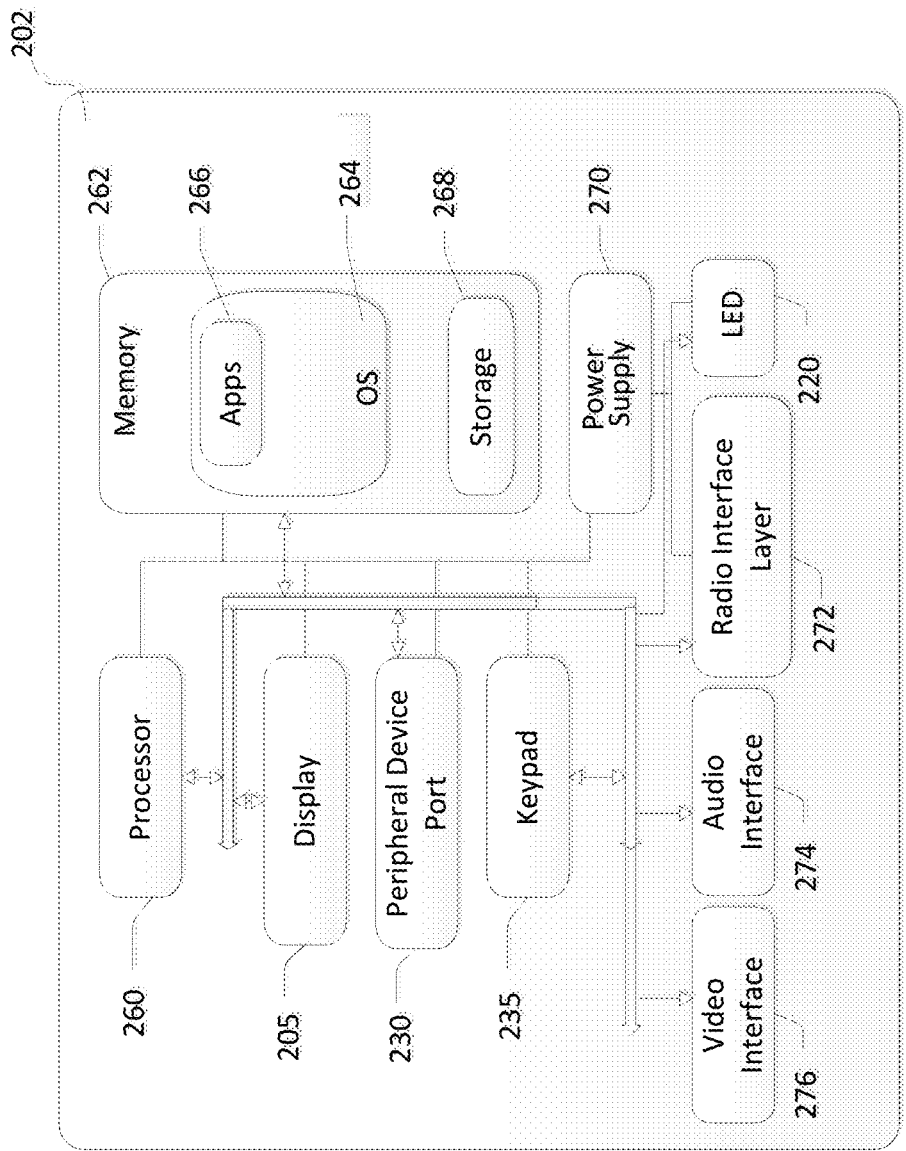
Figure 3:
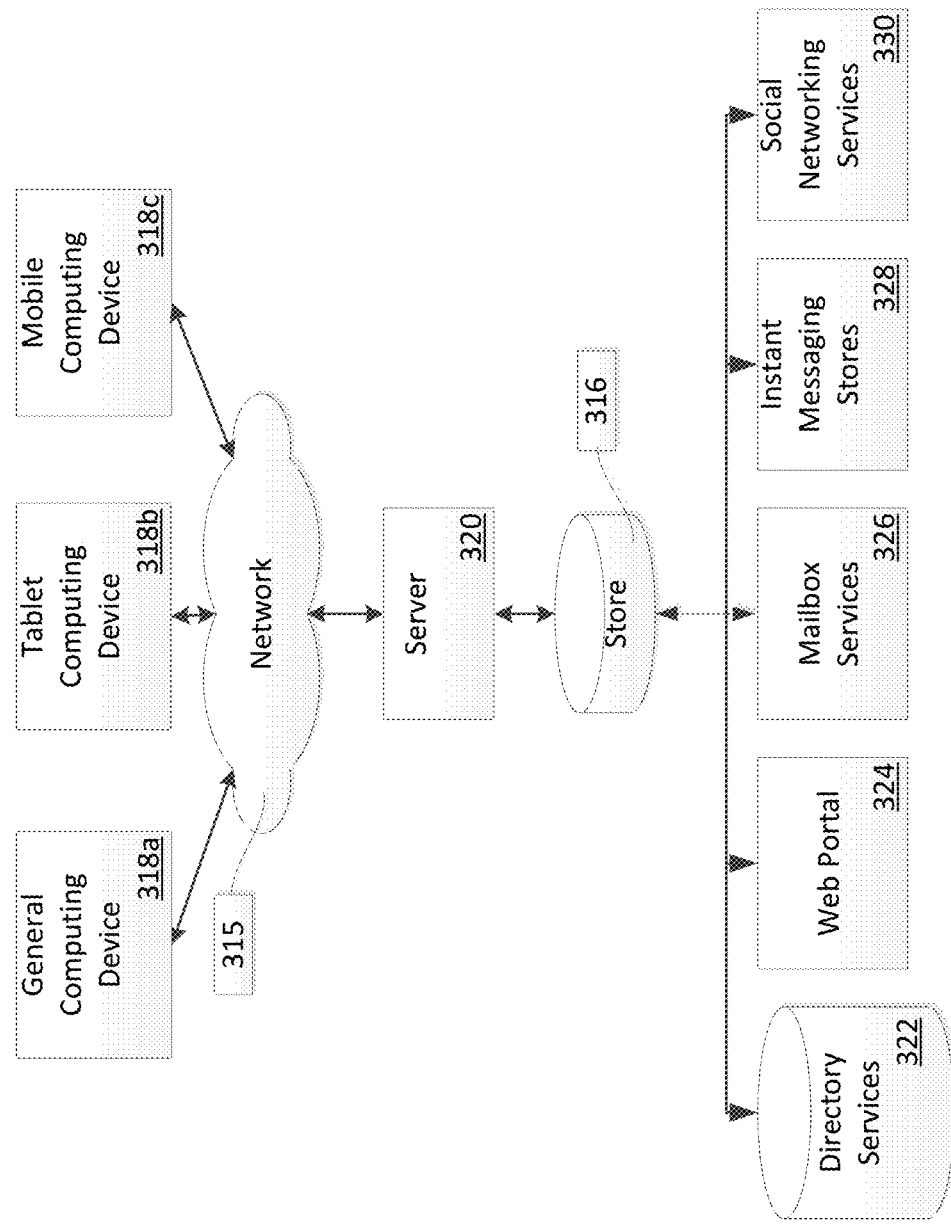
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention described herein.

FIG. 1 is a block diagram illustrating physical components of a computing device 102, for example a mobile processing device, with which examples of the present disclosure may be practiced. For example, computing device 102 may be an exemplary computing device for implementation of an exemplary unified ranker that executes a ranking model as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. For example, mobile computing device 200 may be an exemplary computing device for implementation of an exemplary unified ranker/ranking model as described herein. The mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
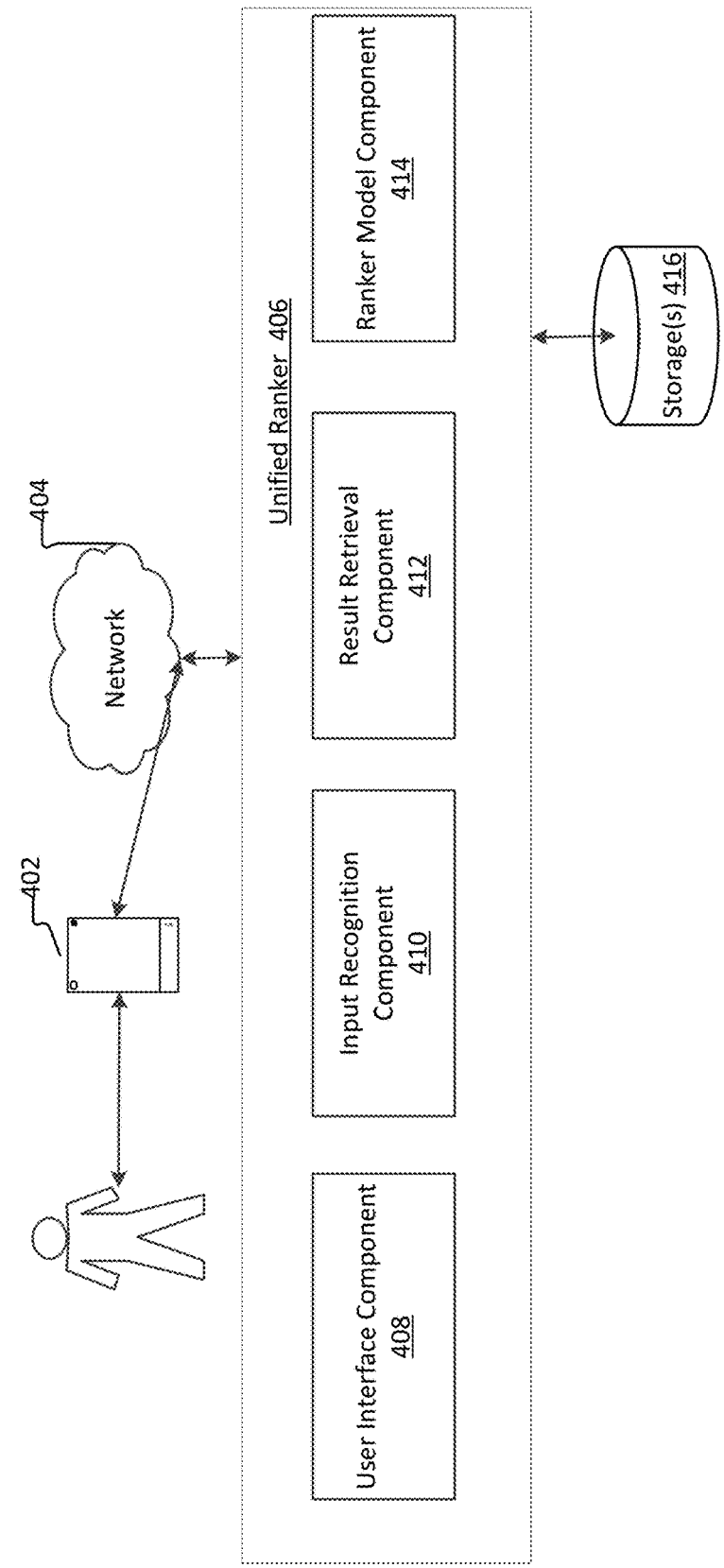
FIG. 4 illustrates an exemplary system implementable on one or more computing devices on which aspects of the present disclosure may be practiced.

FIG. 4 illustrates an exemplary system 400 implementable on one or more computing devices, according to examples described herein. For example, operations for an exemplary unifier ranker/ranker model as described herein may be performed by system 400. Exemplary system 400 presented is a combination of interdependent components that interact to form an integrated whole for learned program generation based on user example operations. Components of system 400 may be hardware components or software implemented on and/or executed by hardware components of system 400. In examples, system 400 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 400 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device A unified ranker is unified collection of processing operations that may be used to build, train and execute a single ranking model that accounts for signals on a query side of processing as well as signals on a document side (e.g., results retrieval side) of processing. As identified above, processing operations performed with respect to execution of unified ranking model may be performed across multiple processing devices included in system 400. As an example, system 400 may comprise one or more processing devices, for example processing device 102 as described in FIG. 1, processing device 200 as described in FIG. 2, etc. An exemplary single unified ranker may employ a unified ranking model that is used to serve and rank results for a plurality of different markets and/or products. In doing so, a unified ranker may execute the unified ranking model to process a plurality of signal data and further evaluate query data and signal data in order to improve operations for ranking search results. Examples described herein referencing application of a unified ranker are not limited to search results obtained over the Internet. Examples also apply to search results obtained in any network or collection of networks. One skilled in the art should recognize that additional signal data can be incorporated into a training corpus for building and applying a ranking model based on the single unified ranker. In examples, system 400 may be configured to receive query data, process the query data, evaluate and rank results for the query data and return one or more results. One or more components of system 400 may be used in providing a single unified ranker as a service that can be accessed by one or more entry points. As identified above, an entry point is a point of entry or platform for communication with an application or service for unified ranking processing. In examples, an entry point may include but is not limited to: any applications/services including search applications, intelligent personal assistant applications, first-party products/services, second-party products/services, and third-party products/services, among other examples.

Further, components of system 400 possesses processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces, etc.), vehicular processing devices, and any other devices having at least one processor, among other examples. Exemplary system 400 comprises unified ranker components 406 including a user interface component 408, an input recognition component 410, a result retrieval component 412, and a ranker model component 414, where each of the identified components may comprise one or more additional components as shown in FIG. 4.

System 400 may further comprises one or more storages 416 that may store data associated with operation of one or more components of system 400. Storages 416 are any physical or virtual memory space. Storages 416 may store any data for processing operations performed by components of system 400, retained data from processing operations, training data, modeling data for execution of processing operations, and knowledge data among other examples. Furthermore, in examples, components of system 400 may utilize knowledge data in processing by components of system 400. Knowledge data is any data that is usable by a component of system 400 to improve processing of any of the unified ranker components 406 where knowledge data can be obtained from resources internal or external to system 400. In examples, knowledge data may be maintained in storage(s) 416 or retrieved from one or more resources external to system 400 by knowledge fetch operation. External resources are any resource (e.g., system, application/service, etc.) that exists and is manageable outside of system 400. External resources include but are not limited to systems, application/services that may be managed by a same organization as system 400 (e.g., other services provided by an organization such as web search services, e-mail applications, calendars, device management services, address book services, informational services, etc.) as well as services and/or websites that are hosted or controlled by third parties. For example, external resources may include line-of-business (LOB) management services, customer relationship management (CRM) services, debugging services, accounting services, payroll services, etc. External resources may further include other websites and/or applications hosted by third parties, such as social media websites; photo sharing websites; video and music streaming websites; search engine websites; sports, news or entertainment websites, and the like. External resources may provide robust reporting, analytics, data compilation and/or storage service, etc., whereas other external resources may provide search engines or other access to data and information, images, videos, and the like.

Processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more circuits. In one example processing device 402 may be a device of a user that is running an application/service that may interact with a user through a dialog exchange. In examples, processing device 402 may communicate with unified ranker components 406 via a network 404. In one aspect, network 404 is a distributed computing network, such as the Internet.

The unified ranker 406 is a collection of components that are used for management of data associated with generation and application of a unified ranking model that may be used to rank result data. Unified ranker 406 comprises a user interface component 408, an input recognition component 410, a result retrieval component 412, and a ranker model component 414. In alternative examples, one or more additional components may be created to manage operations described throughout the present disclosure. Components of the unified ranker 406 may be distributed, for example through a distributed network. In alternative examples, unified ranker 406 may be associated with an application that is stored and executable on processing device 402.

The user interface component 408 comprises one or more components that are configured to enable interaction with a user of an application or service associated with an application or service. Transparency and organization are brought to users of such an application/service through the user interface component 408 where a user can interact with an application through user interface elements. As an example, the user interface component 408 may comprise generation and display of one or more user interface elements upon a display of a processing device. For example, in response to a user action to enter input into the device, the user interface component 408 may receive and process the request and initiate action to display a prompt for entering input into an application/service associated with a processing device upon which the application/service is executing. The user interface component 408 may further execute as a front-end for display of back-end processing performed by components of the unified ranker 406. In examples, user interface definition files may be used to define user interface elements for fostering interaction between a user and a system/service. User interface definition files may comprise programming instructions or operations for management and display of user interface elements associated with user interface component 408.

Input recognition component 410 is a component of the system 400 that receives, processes and tags a received input for recognition. The input recognition component 410 is a component used to process received input. When an input is received, for example via the user interface component 408, the input is transmitted to the input recognition component 410 for processing. As examples described above, inputs processed by the input recognition component 410 include but are not limited to speech/voice input (e.g., utterances), text input, gesture input and handwritten input, among other examples. In one example, a received input may be a query or search query, where a user enters data into a prompt and expects to receive results data from a system/service that employs the exemplary unified ranker.

In examples, the input recognition component 410 may be configured to perform processing operations that evaluate and tag/annotate a query with data that may be useful to the unified ranking model (e.g., ranker model component 414) for ranking of results data identified in response to received query data. As an example, signals evaluated by the input recognition component 410 comprise user context signal data. User context signal data is any type of signal data that can be used to gather information that can be used to evaluate a received query/query data. Examples of user context signals take into account a user, user location, user language data, form-factor of a user device, time data, entry point data, and personalization as context, among other examples. Obtaining such a diverse group of user context signals may provide technical benefits, for example, where a system/service is able to better rank and return results that are most useful to a user. For instance, results data that may perfect for one user might not be that beneficial for another user because of difference in user context. As an example, if a user in Mountain View, Calif. searches for Craigslist, New York's Craigslist may not the right result to show even if it is the most popular URL globally for such a query.

Exemplary user context signal data that may be collected and evaluated may comprise but is not limited to:

User Data: Any data identifying a user that initiated a search query such as a user associated with a processing device that initiated a query (e.g., sent query data). User data may further comprise user location data such as latitude and longitude of a processing device that initiated an input/query.

Language Data: Data indicating languages associated with a user such as language of OS, applications etc. or preferred language for retrieval of a results data, among other examples.

Location Data: Data that may be used to identify any location data from an input/query. For instance, a query may comprise query data that specifies a location (e.g., coffee shops in Seattle, Wash.) that a processing device may acquire/extract from a query.

Form Factor Data: Data that identifies a device type associated with a received query. As an example, such data may be important because intent of a query may be very different based on the device upon which a query is initiated (e.g., desktop versus mobile); alternatively, form factor data may comprise a user intent/desire to obtain result data in a particular form/format (e.g., mobile version of an application/service).

Entry Point Data: Data that indicates a system/application/service that issued the input/query (e.g., transmitted query data for processing). For instance, entry point data is signal data that identifies whether a query is initiated from a search application, an intelligent personal assistant, a word processing application, a calendar application, etc.

Timestamp Data: Data that provides temporal dimensions associated with a received input/query. For instance, timestamp data may be used to evaluate relevance of result data to intent of a user query. As an example, freshness/more recent documents may be relevant to certain queries but not others, providing another dimensional context to evaluate query data.

Personalization/Context data: Data such as location and/or language preference settings of the user of a device or application (e.g., browser, search engine, etc.). As an example, a user may have a profile associated with an entry point from which query data is received. Context data may also consider context data of user with respect to previous queries of the user or other users, domain types, preferences, etc.

In examples, the input recognition component 410 may acquire data for user context signals and annotate query data. The annotated query data may be passed to other components of system 400 such as the result retrieval component 412 and the ranker model component 414 for further processing. Processing operations for collecting such user context signals may be known to one skilled in the art. In examples, such processing operations may comprise one or more computer-executable instructions/programming operations, application programming interfaces (APIs), machine learning processing, and any other type of programming application or service that can extract and annotate user context signal data. One skilled in the art should also recognize that data, for evaluation of query signal data such as user context signals, is collected while respecting privacy laws protecting users.

Result retrieval component 412 is a component of the system 400 that obtains and tags/annotates result data in an index for evaluation by ranker model component 414. In one example, result data may be obtained from one or more sources that may be either internal or external to system 400. For instance, based on a received query, query data may be used to search and obtain candidate results that may satisfy a user query. The result retrieval component 412 component evaluates retrieved results data and may annotate results data so that the ranker model component 414 may rank results based on acquire result retrieval signal data. Result retrieval signal data comprise any data that may be used to provide context for a retrieved result. In examples, the result retrieval component 412 may be configured to perform processing operations that evaluate signals associated with identified result data. In examples, the result retrieval component 412 may utilize a plurality of result retrieval signal data provide context (e.g., content, metadata, query click data, etc.) for results data on an individual basis and/or in comparison with other results data. Result data comprises one or more entries, documents, links, etc., that can be returned as a result to a received input/query. Examples of result retrieval signal data may take into account context data, location data, device/form-factor data, time data, entry point data, click log data/query click graph data, and age of result/document, among other examples. Obtaining such a diverse group of result retrieval signal data may provide technical benefits, for example, where a system/service is able to better rank and return results that are most useful to a user. In examples, the result retrieval component 412 may provide a ranker model component 414 annotated results data that comprises a plurality of results (each annotated based on analysis of the result retrieval signal data) by the result retrieval component 412. In doing so, the result retrieval component 412 may employ one or more processing operations to analyze results of the result data, exemplary processing operations including computer-executable instructions, application programming interfaces (APIs), machine learning processing, and any other type of programming application or service.

Exemplary result retrieval signal data that may be collected and evaluated may comprise but is not limited to:

Location/Language Data: Any data identifying locations associated with content of results data. May comprise click data to determine popularity of a result/document in a specific location. Language of a document may also be tagged to provide context for evaluate a result. Such language and/or location data can be obtained by parsing result data/metadata for result data.

Device/Form Factor Data: Data that can identify how result data may be presented on a processing device. Such data may be used to identify suitability for result data, for example where the unified ranker in combining such signal data with form factor data obtained on a query side (e.g., user context signals), can evaluate results in a form factor manner. For instance, a mobile version of a result may not be preferable for display on a user device that is a desktop computer.

Click Signal Data: Data that identifies click history or click streams related to a result data for one or more users. Click data can be mined and evaluated to provide context for a result to assist in identifying ranking model in determining whether a result should be returned to a user.

Global/Local Evaluation Data: Data that indicates whether a result is targeting a global or a local audience. For instance, a Swedish version of a website may be useful to return as a result in Sweden but may not be as useful for a result returned in the United States. Alternatively, modeling may evaluate such data and use it in combination with the query side signal data to determine whether the user who initiated the query intended to obtain a Swedish version of a result such as a website, for example.

Primary/Secondary Location Data: Data that indicates location information of a document/result. For instance, primary location information may be obtained explicitly based on evaluation of Global Position Data (GPS) data, latitude/longitude, metadata of a result, etc. Secondary location data may be obtained implicitly through evaluation of metadata and/or metric data (e.g., evaluation of page views/clicks, query click data associated with a result, etc.).

Age/Timestamp Data: Data indicating age of document. As an example, may be a timestamp of when result data was created/posted or alternatively, last viewed. May be any other data including words/n-grams that provide indication of how to classify a document or relevance of document based on age.

Processing operations for collecting such result retrieval signal data may be known to one skilled in the art. In examples, such processing operations may comprise one or more computer-executable instructions/programming operations, application programming interfaces (APIs), machine learning processing, and any other type of programming application or service that can extract and annotate result retrieval signal data. One skilled in the art should also recognize that data, for evaluation of result retrieval signal data, is collected while respecting privacy laws protecting users and/or countries associated with result data.

The ranker model component 414 is a component of the system 400 that evaluates user context signal data (received from the input recognition component 410) and retrieval result signal data (received from the result retrieval component 412) as well as any other signal data that system 400 may be programmed to collect and annotate. The ranker model component 414 may comprise a corpus of training data that can be used to execute a unified ranking model to evaluate and rank result data based on collected signals on a query side and document side. In examples, a corpus of training data may be stored in at least one storage 416 associated with system 400. Training data may comprise a plurality of data from different processing devices, users, entry points, among other types of context. In examples, training data may comprise a plurality of click log data where processing operations can be applied to evaluate such data in view of obtained from user context signals and/or result retrieval signals. Training data may further comprise any type of knowledge data obtained by system 400 from resources internal or external to system 400. For instance, a knowledge fetch operation may be performed to gather/fetch data that may be useful for the ranker model component 414 to evaluate queries and/or results. Training data may also comprise data obtained from third-party services. An exemplary unified ranking model may be extensible to interface with third-party services where data can be passed to system/service components such as the ranker model component 414 to process queries received by third-party services and return ranked results to the third-party services. In examples, generation of the unified ranking model may be executed offline. For example, processing operations may be applied to evaluate the training data and generate a single unified ranking model that can be applied to evaluate received query data. For instance, machine learning modeling or algorithms may be applied to evaluate the training data and develop a single unified ranking model. In other examples, generation of a unified ranking model may occur at runtime.

The ranker model component 414 may execute the generated unified ranking model in application of processing operations that can manipulate the corpus of training data to rank results data. For instance, the ranker model component 414 may employ processing operations that perform feature extraction and manipulation of training data (e.g., feature engineering) to evaluate result data across a plurality of dimensions based on acquired user context signals and acquired result retrieval signals. Processing operations that may be performed for creating/building a ranking model may comprise but are not limited to: hierarchical learning operations, guarded tree processing operations, machine learning processing operations, and any other type of statistical or correlation modeling. In some examples, processing operations performed may comprise multi-level layer analysis where different aspects/dimensions of ranking analysis may be performed at different levels of ranking operations, and findings may correlated in a complete ranking analysis. In examples, execution of a unified ranking model may assign different weights to different features and analyze results data using acquired signal data. For instance, a plurality of features may be available to rank result data and ranking processing operations/models may assign a weight to one or more of the available features. Modeling performed by the ranker model component 414 may be configured to determine which features are important for evaluation of result data depending on the acquired user context signals and the acquired result retrieval signals. Weights assigned to features may vary on query by query basis. A trained ranking model may identify instances where certain signals from at least one of a query (e.g., user context signals) and results (e.g., result retrieval signals) may indicate how to assign weights for ranking of result data. One skilled in the art should further recognize that processing operations executed to rank and evaluate result data may be configurable and customizable.

Once features are identified, the ranker model component 414 may execute processing operations to evaluate acquired signals to rank result data. In an example, a unified ranking model may execute affinity/distance processing operations or functions to process feature data (based on the acquired user context signals and the acquired result retrieval signals) in order to rank result data based on identified context. In such examples, affinity/distance processing operations may be used to determine the probability of user satisfaction based on context associated with the collection of acquired signal data. For example, user satisfaction with result data may be estimated based on user and document location or language or device affinity.

The ranker model component 414 may further be configured to execute policy determination processing operations for output of ranked result data. In examples, one or more ranked results may be output based on a received query. Policy rules may be set by administrators and/or program developers to determine how to output ranked result data. As an example, policy rules may be set to evaluate whether to provide one or more ranked results, disambiguate between results data, request clarification from a user, etc. Furthermore, the ranker model component 414 may continuously manage, update and improve its unified ranking model. Continuous scaling and update of training data may occur, debugging operations may be performed, metrics and telemetry analysis may be performed including employing analysis tools, sampling, test operations, flighting operations, etc.

Figure 5:
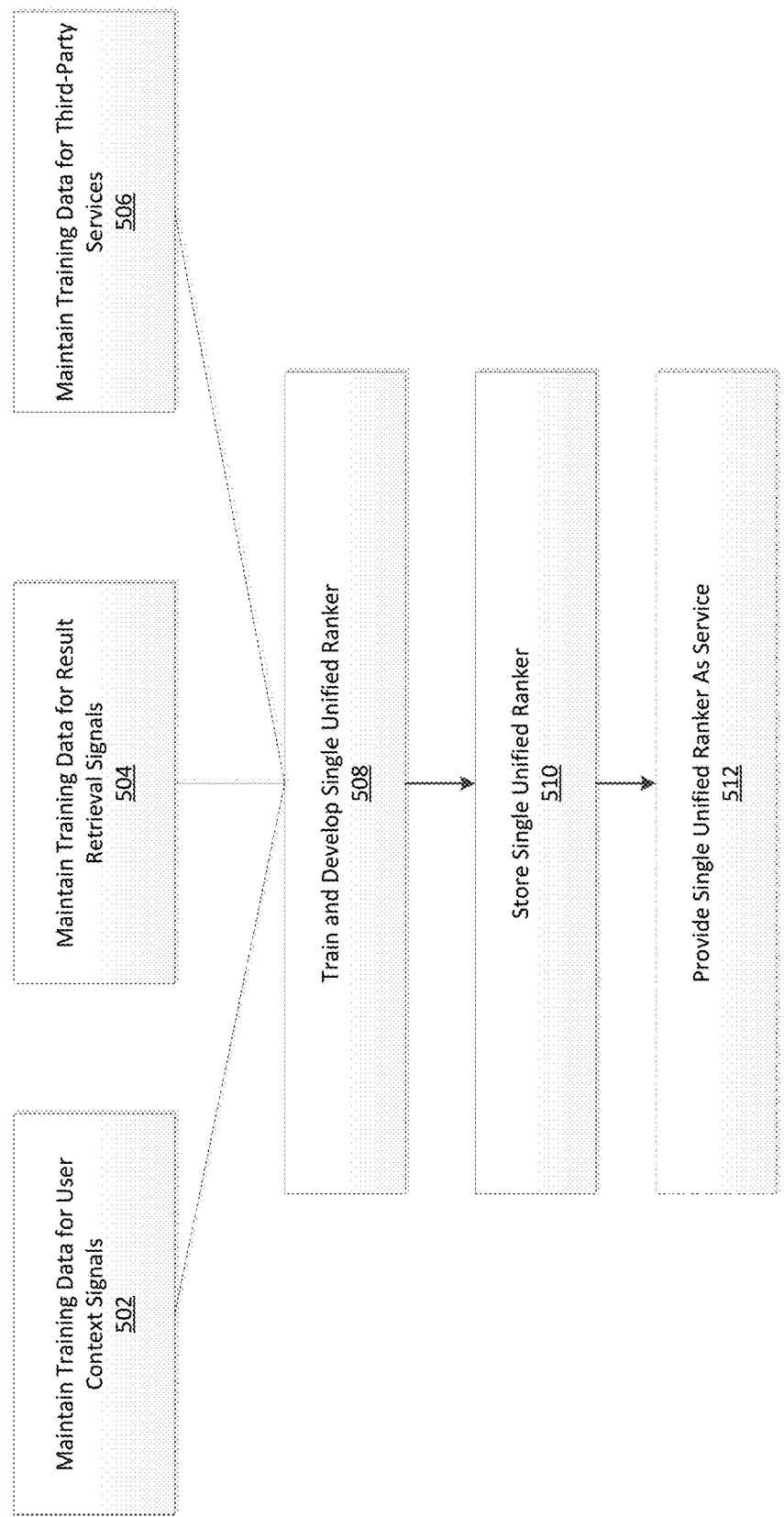
FIG. 5 is an exemplary method for management of a unified ranking model with which aspects of the present disclosure may be practiced.

FIG. 5 is an exemplary method 500 for management of a unified ranking model with which aspects of the present disclosure may be practiced. As an example, method 500 may be executed by an exemplary system such as shown in one or more of FIGS. 1-4. In examples, method 500 may be executed on a device comprising at least one processor configured to store and execute operations, programs or instructions. However, method 500 is not limited to such examples. In at least one example, method 500 may be executed (e.g., computer-implemented operations) by one or more components of a distributed network, for instance, web service/distributed network service (e.g. cloud service). In examples, operations performed in method 500 may correspond to operations executed by a system and/or service that execute computer programs, application programming interfaces (APIs), or machine-learning processing, among other examples.

Method 500 begins at operations 502-506 where such operations describe maintaining and managing a variety of training data for ranking modeling of an exemplary unified ranker. A unified ranker may comprise a unified ranking model that the unified ranker executes to evaluate and rank results data as well as return ranked results data. Maintaining of training data may comprise processing operations related to acquiring training data, evaluating training data and updating training data, among other processing operations. In operation 502, training data for user context signal data may be maintained. Training data and user context signal data are described above in detail in the description of FIG. 4. In operation 504, training data for result retrieval signal data may be maintained. Training data and result retrieval signal data are described in detail in the description of FIG. 4 above. In operation 506, training data for third-party services may be maintained. Training data and third-party services are described in detail in the description of FIG. 4 above. In examples, a component for a unified ranker may interface with third-party services to obtain data to train a unified ranker to create dimensions and/or features to best analyze input or queries received from third-party services. Communication between systems/services and third-party services is known to one skilled in the art.

Flow may proceed to operation 508, where training data maintained in operations 502-506 may be used to train and develop a unified ranker. As identified above, a unified ranker is unified collection of processing operations that may be used to generate a ranking model that may be used to evaluate received signals on a query side of processing as well as signals on a document side (e.g., result retrieval side) of processing. As identified above, exemplary unified rankers may be tied to processing devices configured for execution of processing operations associated with a single unified ranker. Operation 508 may comprise aggregating/combining training data maintained in processing operations 502-506 and building a corpus of training data that combines all acquired training data. In examples, operation 508 may further comprise processing operations for organizing and indexing the corpus of training data. Furthermore, operation 508 may comprise continuously updating the corpus of training data to improve the unified ranking model. In examples, generation of the unified ranking model may be executed offline. For example, processing operations may be applied to evaluate the training data and generate a unified ranking model that can be applied to evaluate received query data. For instance, machine learning modeling or algorithms may be applied to evaluate the training data and develop a unified ranking model.

Flow may proceed to operation 510 where the unified ranking model may be stored. As an example, the unified ranking model may be stored in a memory of one or more processing devices and enable the processing device/devices to perform specific operations pertaining to ranking processing described herein. In examples, the unified ranking model may be stored as an application that is able to be used by and/or integrated within other applications. For instance, the unified ranking model may be a component within an intelligent personal assistant or search application that executes upon a client device. In some examples, flow may proceed to operation 512 where an exemplary unified ranking model may be provided as a service for receiving query data, ranking result data, and returning one or more ranked results. In one example, the unified ranking model may be stored upon one or more server devices that are accessible over a distributed network by a plurality of other processing devices.

FIG. 6 is an exemplary method 600 for processing using a unified ranking model with which aspects of the present disclosure may be practiced. As an example, method 600 may be executed by an exemplary system such as shown in FIGS. 1-4. In examples, method 600 may be executed on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g. cloud service). In examples, operations performed in method 600 may correspond to operations executed by a system and/or service that execute computer programs, application programming interfaces (APIs), or machine-learning processing, among other examples.

Method 600 begins at operation 602, where query data is received. Query data may be received from any of a plurality of entry points. Entry points are described above, e.g., in the description of FIG. 4. In examples, query data and context data associated with a query may be evaluated. For instance, user context signal data associated with a query may be evaluated and tagged as described, e.g., in the description of the input recognition component 410 of FIG. 4.

Flow proceeds to operation 604 where a plurality of user context signals are acquired. User context signals are received signals programmed to correspond with the types of user context signal data described in the description of FIG. 4. Operation 604 may comprise evaluating data associated with the received query to tag/annotate query data based on acquired user context signals. In one example, processing performed in operation 604 may be executed by a component such as the input recognition component 410 described in FIG. 4. In examples, the plurality of user context signals comprise at least two selected from a group consisting of: user location data, language data, location data for the received query, form-factor data associated with a processing device from which the query was transmitted, entry point data, time data, and context data associated with user that initiated the query. The tagged/annotated query data may be propagated to a component for processing operations related to ranking modeling to determine how to rank results obtained in response to the received query. In examples, the plurality of user context signals comprise signal data corresponding with: location data, language data, location data retrieved from the query data, form-factor data associated with the processing device from which the query data is received, entry point data, time data, and context data associated with user that submitted the query data.

Flow proceeds to operation 606 where results are retrieved and a plurality of result retrieval signals are acquired for the retrieved results. Results retrieval signals are received signals programmed to correspond with the types of result retrieval signal data described in the description of FIG. 4. Operation 606 may comprise evaluating data associated with results identified in response to received query data. For instance, processing operations performed may execute a knowledge fetch and/or search operation to identify candidate results to return based on input in a received query. Result data may be evaluated, tagged/annotated (based on processing of the result retrieval signal data) and propagated to a component for ranking modeling to determine how to rank obtained results. In one example, processing performed in operation 606 may be executed by a component such as the result retrieval component 412 described in FIG. 4. In examples, the plurality of result retrieval signals comprise signal data corresponding with: location information for the result data, language corresponding with the result data, form-factor for results of the result data, query click signal data associated with results of the result data, and timestamp data corresponding to results of the result data.

Flow may proceed to operation 608, where a unified ranking model is applied or executed for ranking of the results data. In some examples, operation 608 may be performed by a component such as the ranker model component 414 described in the description of FIG. 4. Operation 608 may comprise one or more operations described in the description of the ranker model component 414 of FIG. 4. In examples, a unified ranking model may be generated offline based on evaluation of a corpus of training data. Operation 608 may comprise using the generated unified ranking model to evaluate received and/or obtained signal data such as the acquires user context signals and the acquired result retrieval signals. Execution (operation 608) of the unified ranking model may comprise executing feature normalization on data (e.g. stored training data) of the unified ranking model based on the acquired user context signals and the acquired result retrieval signals. In doing so, operation 608 may comprise generation of normalized feature data. The normalized feature data may be used by the unified ranking model to tailor processing to a particular context identified by analyzing the acquired user context signals and the acquired result retrieval signals. Operation 608 may further comprise ranking the results/result data. As an example, operation 608 may comprise executing machine learning processing that evaluates the normalized training data based on the acquired user context signals and the acquired result retrieval signals to generate ranked results data. In one example, operation 608 may apply an affinity/distance function to process the normalized feature data to generate ranked results data.

Once a unified ranking model is applied, flow may proceed to operation 610 where a policy determination is made to output ranked results data. Policy rules may be set or applied that can evaluate the ranked results data and determine which results data is to be output. In examples, a threshold determination may be used to determine a number of results to output. One skilled in the art should recognize that policy rules for determining output of ranked results may be customizable and extensible. Operation 610 may comprise outputting one or more ranked results of the result data based on application of the unified ranking model. In examples, outputting of results data performed in operation 610 may comprise at least one of displaying one or more ranked results on a processing device and transmitting the one or more ranked results to another processing device.

Flow may proceed to decision operation 612, where it is determined whether subsequent query data is received. If not, flow branches NO and method 600 ends or remains idle until new query data is received. If subsequent query data is received, flow branches YES and flow returns to operation 602 to process the subsequent query data. In one example, subsequent query data may be updated query data. The updated query data may be received. A plurality of user context signals may be acquired for the updated query. A plurality of result retrieval signals may be acquired for the updated query. A unified ranking model may be executed to rank the results of for the updated query data, and the unified ranking model may be applied to rank the results and output one or more of the results for the updated query data.

FIG. 7 is an exemplary method 700 for providing a unified ranker as a service with which aspects of the present disclosure may be practiced. As an example, method 700 may be executed by an exemplary system such as shown in FIGS. 1-4. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g. cloud service). In examples, operations performed in method 700 may correspond to operations executed by a system and/or service that execute computer programs, application programming interfaces (APIs), or machine-learning processing, among other examples. Providing a single unified ranker as a service enables a plurality of entry points to interface with the single unified ranker so that the single unified ranker may be used to serve a plurality of different products and markets. Among other benefits, creation and maintenance of a single unified ranker provides greater efficiency for processing and maintenance as compared with maintaining a plurality of rankers and blending results from larger number of rankers. Furthermore, accuracy in understanding received queries may be improved, for example, where a plurality of context signals from both a query side and a document side may be used to best evaluate result data before returning results to a user.

Method 700 begins at operation 702, where an exemplary unified ranker is provided as a service that is accessible by a plurality of entry points. Exemplary unified rankers and entry points are described above. Flow may proceed to operation 704 where query data is received from an entry point of the plurality of entry points. In examples, an entry point may be associated with one or more processing devices. In examples, operation 704 may further comprise retrieving results data in response to processing the query data. An exemplary unified ranking model for the unified ranker may be applied to rank the retrieved results data.

Flow may proceed to operation 706 where a unified ranking model is executed to rank results for the query using the unified ranker. In examples, operation 706 comprises manipulating feature data of the unified ranking model based on acquired user context signals associated with the received query data and processing of acquired result retrieval signals corresponding with the retrieved results data. Manipulation of feature data or feature engineering is described, e.g., in further detail the description of ranker model component 414 of FIG. 4. In examples, execution of the ranker model comprises executing feature normalization based on the acquired signal data. For instance, operation 706 may further comprise manipulating feature data of the unified ranking model based on acquired result retrieval signals identified or fetched in response to the received query. In examples, the plurality of user context signals that may be acquired comprise at least two selected from a group consisting of: user location data, language data, location data for the received query, form-factor data associated with a processing device from which the query was transmitted, entry point data, time data, and context data associated with user that initiated the query. In examples, the plurality of result retrieval signals that may be acquired comprise at least two selected from a group consisting of: location information in association with result data, language corresponding with result data, form-factor of result data, query click signal data, and age data corresponding to result data. As an example, operation 706 may comprise executing machine learning processing that evaluates normalized training data based on the acquired user context signals and the acquired result retrieval signals. In one example, operation 706 uses an affinity/distance function to consume the acquired user context signals and the acquired result retrieval signals for ranking of the results. Execution of the unified ranking model may generate ranked results data.

Flow may proceed to operation 708, where one or more ranked results are returned to a processing device. In operation 708, ranked results may be returned to one or more processing devices including a processing device corresponding with the entry point. Operation 708 may determine the one or more results to be returned based on execution of the unified ranking model. Further detail regarding processing operations for ranking of result data and policy determination related to out at least output of ranked result data is described, e.g., in the description of the ranker model component 414 of FIG. 4.

Flow may proceed to decision operation 710, where it is determined whether subsequent query data is received. If not, flow branches NO and method 700 ends or remains idle until new query data is received. If subsequent query data is received, flow branches YES and flow returns to operation 704 to process the subsequent query data. In one example, subsequent query data may be updated query data. The updated query data may be received from the same entry point that initiated a previous query. A plurality of user context signals may be acquired for the updated query. A plurality of result retrieval signals may be acquired for the updated query. A unified ranking model may be executed to rank the results of for the updated query data, and the unified ranking model may rank the results and output one or more of the results for the updated query data. In alternative examples, subsequent query data may be received from a different entry point of the plurality of entry points.

FIG. 8 is an exemplary method 800 for interacting with third-party services with which aspects of the present disclosure may be practiced. As an example, method 800 may be executed by an exemplary system such as shown in FIGS. 1-4. In examples, method 800 may be executed on a device comprising at least one processor configured to store and execute operations, programs or instructions. However, method 800 is not limited to such examples. In at least one example, method 800 may be executed (e.g., computer-implemented operations) by one or more components of a distributed network, for instance, web service/distributed network service (e.g. cloud service). In examples, operations performed in method 800 may correspond to operations executed by a system and/or service that execute computer programs, application programming interfaces (APIs), or machine-learning processing, among other examples. As an example of method 800, a third-party service may wish to interface with an application for a single unified ranker, for example, that may be offered as a service. In some cases, the third-party service may not have capability to perform search query operations and return results. However, in other cases, a third-party service may wish to incorporate its services with an entity that has access to a larger number of resources, among other examples.

As an example, consider an educational service (e.g., third-party service) that may wish to integrate search operations within its service. In such an example, the third-party service may interact with an application/service for a single unified ranker to pass query search results to the application/service for the single unified ranker. In one instance, a user may use the educational service to query "flowers." In most cases, the application/service for the single unified ranker may return results for flower shops. However, the third-party educational service may pass third-party specific data (e.g., context data) to the application/service for the single unified ranker. The application/service for the single unified ranker may use the third-party specific data to add a dimension to a corpus of training data for the single unified ranker, for example indicating that result data for queries passed by the third-party service should return educational results such as educational entries for flowers. In such a way, a ranking model based on the single unified ranker may be generated that takes into account dimensional data in evaluating user context signals and result retrieval signals associated with a query. Thus, when a third-party service passes a query to unified ranker service, the unified ranker service may recognize the third-party service, generate a model to account for the third-party service, and return results that are most accurate for the user of the third-party service. Such an example illustrates one of the ways that the application/service for a single unified ranker may be extensible to interface with and provide at least one benefit to third-party services.

Method 800 begins at operation 802, where third-party specific data is received from a third-party service. In examples, third-party specific data may be transmitted to/received at an application/service for a component associated with a unified ranking model. Examples of applications/services associated with a unified ranking model are described above in the description of at least FIG. 4. In examples, the third-party specific data may comprise context information for processing of queries received from the third-party service. An application/service for a unified ranking service may interface with one or more third-party services to enable passing of data between services. For instance, the application/service for a unified ranking service may define parameters and/or rules for processing of data received from third-party services. Alternatively, third-party services may define parameters and/or rules for processing of data transmitted to the application/service for a unified ranking model. In examples, Training data for the third-party service may be added to a corpus of training data for a unified ranking model. That is, a unified ranking model may be updated to comprise third-party specific data and training data associated with the third-party specific data. Training data for third-party specific data may comprise data received from the third-party service and analysis data/metric data obtained with respect to evaluation of the third-party specific data. As an example, operation 802 may comprise processing operations that add one or more dimensions or features for the third-party specific data to the corpus of training data. In examples, the corpus of training data may be updated with the third-party data and the ranker model may be trained with the updated data prior to a query passed by the third-party service. In this way, ranker model may be generated that is customizable and current for processing of data received from any system and/or application/service.

Flow may proceed to operation 804 where an updated unified ranking model is provided. As an example, the updated unified ranking model may be provided as a service that is accessible by a plurality of entry points including entry points corresponding with third-party services.

Flow may proceed to operation 806 where query data may be received from a third-party service and processed. Processing performed in operation 806 may comprise evaluating user context signal data associated with the third-party service query as well as retrieving results data associated with the query data. a ranking model may be generated for ranking result data retrieved by the application/service for a single unified ranker in response to a query passed by the third-party service.

At operation 808, the updated unified ranking model is executed to rank and return/output results data to the third-party service. In examples, execution of the unified ranking model may comprise processing operations that use feature data of the generated model to evaluate at least user context signals acquired for a received query and result retrieval signals for result data identified by the application/service for the unified ranking model in response to the received query. In examples, operation 808 may comprise generation of feature data for evaluation of signals associated with a query received from the third-party service. In doing so, operation 808 may take into account dimensional data in evaluating user context signals and result retrieval signals associated with a query passed by the third-party service. In some examples, user context signal data may be passed by the third-party service to the application/service for a single unified ranker employing a unified ranking model. For instance, a future query received from the third-party service may comprise additional processing data indicating tagging of user context signals described above in the description of at least FIG. 4. In other examples, the third-party service may interface with applications or services for the single unified ranker, to enable the unified ranking model to evaluate user context signal data. In operation 808, result data may be ranked based on execution of the unified ranking model. Operation 808 may further comprise processing operations for policy determination to transmit/output one or more ranked results to the third-party service.

Flow may proceed to decision operation 810, where it is determined whether subsequent query data is received. If not, flow branches NO and method 800 ends or remains idle until new query data is received. If subsequent query data is received, flow branches YES and flow returns to operation 806 to generate a model to rank results for a received query.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A computer-implemented method comprising:
receiving query data;
acquiring, by a processing device, a plurality of user context signals associated with the received query data, wherein at least one signal in the plurality of user context signals represents entry point data corresponding to at least one of an application or service used to provide the at least one signal;
retrieving results data for the query data;
acquiring, by the processing device, a plurality of result retrieval signals corresponding with the retrieved results data, wherein at least one signal in the plurality of result retrieval signals represents a form factor of the processing device;
executing a unified ranking model to rank the results data, wherein the executing comprises:
 executing feature normalization on data of the unified ranking model based on the acquired user context signals and the acquired result retrieval signals to generate normalized feature data,
 applying the normalized feature data to rank the results data; and outputting ranked results data based on application of the unified ranking model.

2. The computer-implemented method according to claim 1, wherein the unified ranking model is provided as a service that is accessible to a plurality of entry points.

3. The computer-implemented method according to claim 1, wherein the applying of the normalized feature data further comprises executing machine learning processing that evaluates the normalized feature data to generate the ranked results data.

4. The computer-implemented method according to claim 3, wherein the executing of the unified ranking model executes an affinity/distance function to process the acquired user context signals and the acquired result retrieval signals for ranking of the results data.

5. The computer-implemented method according to claim 1, wherein the plurality of user context signals comprises signal data corresponding with: location data, language data, location data retrieved from the query data, form-factor data associated with a processing device from which the query data is received, entry point data, time data, and context data associated with a user that submitting the query data.

6. The computer-implemented method according to claim 1, wherein the plurality of result retrieval signals comprises signal data corresponding with: location information for the result data, language corresponding with the result data, form-factor of the result data, query click signal data the result data, and timestamp data corresponding to the result data.

7. The computer-implemented method according to claim 1, further comprising:
receiving updated query data,
acquiring, by the processing device, a plurality of user context signals associated with the updated query data;
retrieving updated results data for the updated query data;
acquiring, by the processing device, a plurality of result retrieval signals corresponding with the updated results data;
executing the unified ranking model to rank the updated results data, and
outputting one or more of the updated results data based on application of the unified ranking model.

8. The computer-implemented method according to claim 1, wherein the outputting further comprises at least one of: displaying the one or more ranked results on the processing device, and transmitting the one or more ranked results to another processing device.

9. A system comprising:
at least one processor; and
a memory operatively connected with the processor, wherein the memory stores computer-executable instructions, that cause the processor to perform:
receiving, from a processing device, query data;
acquiring a plurality of user context signals associated with the received query data, wherein at least one signal in the plurality of user context signals represents entry point data corresponding to at least one of an application or service used to provide the at least one signal;
retrieving results data for the query data;
acquiring a plurality of result retrieval signals corresponding with the retrieved results data, wherein at least one signal in the plurality of result retrieval signals represents a form factor of the processing device;
executing a unified ranking model to rank the results data, wherein the executing manipulates feature data of the unified ranking model based on processing of acquired user context signals associated with the received query data and acquired result retrieval signals corresponding with the retrieved results data; and
providing ranked results data to the processing device.

10. The system according to claim 9, wherein the plurality of user context signals comprises signal data corresponding with: location data, language data, location data retrieved from the query data, form-factor data associated with the processing device associated with the entry point, entry point data, time data, and context data associated with a user that submitted the query data, and wherein the plurality of result retrieval signals comprises signal data corresponding with: location information for the result data, language corresponding with the result data, form-factor for the result data, query click signal data associated with the result data, and timestamp data corresponding to the result data.

11. The system according to claim 9, wherein execution of the unified ranking model further comprises executing machine learning processing that evaluates the manipulated feature data based on the acquired user context signals and the acquired result retrieval signals.

12. The system according to claim 11, wherein the machine learning processing applies an affinity/distance function to process the acquired user context signals and the acquired result retrieval signals for ranking of the results.

13. The system according to claim 9, wherein computer-executable instructions further comprise an instruction that causes the processor to perform:
receiving updated query data from the entry point,
acquiring a plurality of user context signals associated with the updated query data;
acquiring a plurality of result retrieval signals based on results identified in response to the updated query data;
retrieving updated results data for the updated query data;
executing the unified ranking model to rank the updated results data; and
transmitting one or more of the updated results data to the processing device.

14. The system according to claim 9, wherein computer-executable instructions further comprise an instruction that causes the processor to perform:
receiving additional query data from another entry point, wherein the another entry point corresponds with another processing device;
acquiring a plurality of user context signals associated with the additional query data;
acquiring a plurality of result retrieval signals based on results identified in response to the updated query data;
retrieving results data for the additional query data;
executing the unified ranking model to rank the results data for the additional query data; and
transmitting one or more of the results data to the another processing device corresponding with the another entry point.

15. A system comprising:
at least one processor; and
a memory operatively connected with the processor, wherein the memory stores computer-executable instructions that, when executed, cause the processor to perform:
receiving, from a third-party service, third-party specific data to update a unified ranking model that is configured to rank search results, wherein the third-party specific data comprises user context signals representing at least one of an application or service used to provide the user context signals;

providing the updated unified ranking model as a service;

receiving query data from the third-party service;

retrieving results data for the query data, wherein at least a portion of the results data represents a form factor of a processing device used to provide the query data;

executing the updated unified ranking model to rank the results data, wherein the executing utilizes the third-party specific data to generate feature data for evaluation of signal data associated with the query data that is received from the third-party service; and returning at least one of the ranked results data to a processing device corresponding with the third-party service based on execution of the updated unified ranking model.

16. The system according to claim 15, wherein the third-part specific data comprises context information for processing queries received from the third-party service.

17. The system according to claim 15, wherein the system receives, from the third-party service, a plurality of user context signals associated with the received query data.

18. The system according to claim 17, wherein the retrieving of the results data further comprises retrieving a plurality of results retrieval signals for each result of the result data.

19. The system according to claim 18, wherein the plurality of user context signals comprise signal data corresponding with: location data, language data, location data retrieved from the query data, form-factor data associated with the processing device from which the query data is received, entry point data, time data, and context data associated with user that submitted the query data, and wherein the plurality of result retrieval signals comprise signal data corresponding with: location information for the result data, language corresponding with the result data, form-factor for the result data, query click signal data associated with the result data, and timestamp data corresponding to the result data.

20. The system according to claim 19, wherein execution of the updated unified ranking model further comprises executing the updated unified ranking model to rank the results data based on evaluation of the plurality of user context signals and the plurality of result retrieval signals.

* * * * *